United States Patent
Speckhart et al.

[19]

[11] Patent Number: 5,975,568
[45] Date of Patent: Nov. 2, 1999

[54] SENSOR PAD FOR CONTROLLING AIRBAG DEPLOYMENT AND ASSOCIATED SUPPORT

[75] Inventors: Frank H. Speckhart, Knoxville; Robert Scott Baker, Dandridge, both of Tenn.

[73] Assignee: American Components, Inc., Dandridge, Tenn.

[21] Appl. No.: 09/146,677

[22] Filed: Sep. 3, 1998

Related U.S. Application Data

[63] Continuation-in-part of application No. 29/085,897, Apr. 1, 1998, and application No. 09/072,833, May 5, 1998.
[51] Int. Cl.$^6$ .............................. B60R 21/32; B60K 28/00
[52] U.S. Cl. ............................................ 280/735; 180/273
[58] Field of Search .................................... 180/273, 271; 280/735, 734; 297/DIG. 3, 199, 217.2; 340/667; 73/37, 700; 5/706, 707

[56] References Cited

U.S. PATENT DOCUMENTS

| | | | |
|---|---|---|---|
| 2,842,957 | 7/1958 | Bacon, Jr. | 73/37 |
| 4,644,597 | 2/1987 | Walker | 5/449 |
| 4,957,286 | 9/1990 | Persons, II et al. | 272/73 |
| 5,117,373 | 5/1992 | Huff | 364/550 |
| 5,427,331 | 6/1995 | Stroud | 244/122 AG |

*Primary Examiner*—Lanna Mai
*Assistant Examiner*—Faye M. Fleming
*Attorney, Agent, or Firm*—Pitts & Brittian, P.C.

[57] ABSTRACT

A sensor pad for controlling the deployment of an automobile airbag. Weight sensing pad 10 is used in the seat 54 of an automobile, (not illustrated), to detect the presence of an occupant on the seat. Weight sensing pad 10 is used in conjunction with the vehicle's airbag control module in order to allow deployment of the airbag, in the event of a collision, only if the seat is occupied by a person of a preselected weight. Weight sensing pad 10 is defined by a bladder member 15 having an interior volume subdivided into a plurality of individual cells 42 in fluid communication with each other and that is filled with a non-compressible fluid 18, such as silicon or a silica gel of medium viscosity. A pressure tube 22 is in fluid communication with bladder 15 and is in further fluid communication with a pressure activated electronic transducer 26 which in turn is in electronic communication with the airbag controller 30. When a person sits upon weight sensing pad 10, there is a volumetric displacement of fluid 18 that provides a pressure change in the bladder member. If there is a sufficient pressure change due to the volumetric displacement of fluid to activate transducer 26, transducer 26 sends a signal to air bag controller 30. Electronic transducer 26 is selected to generate a signal upon detection of pressure resultant from the volumetric displacement of fluid 18 from bladder 15 expected from the average size adult of approximately one hundred pounds or heavier.

20 Claims, 6 Drawing Sheets

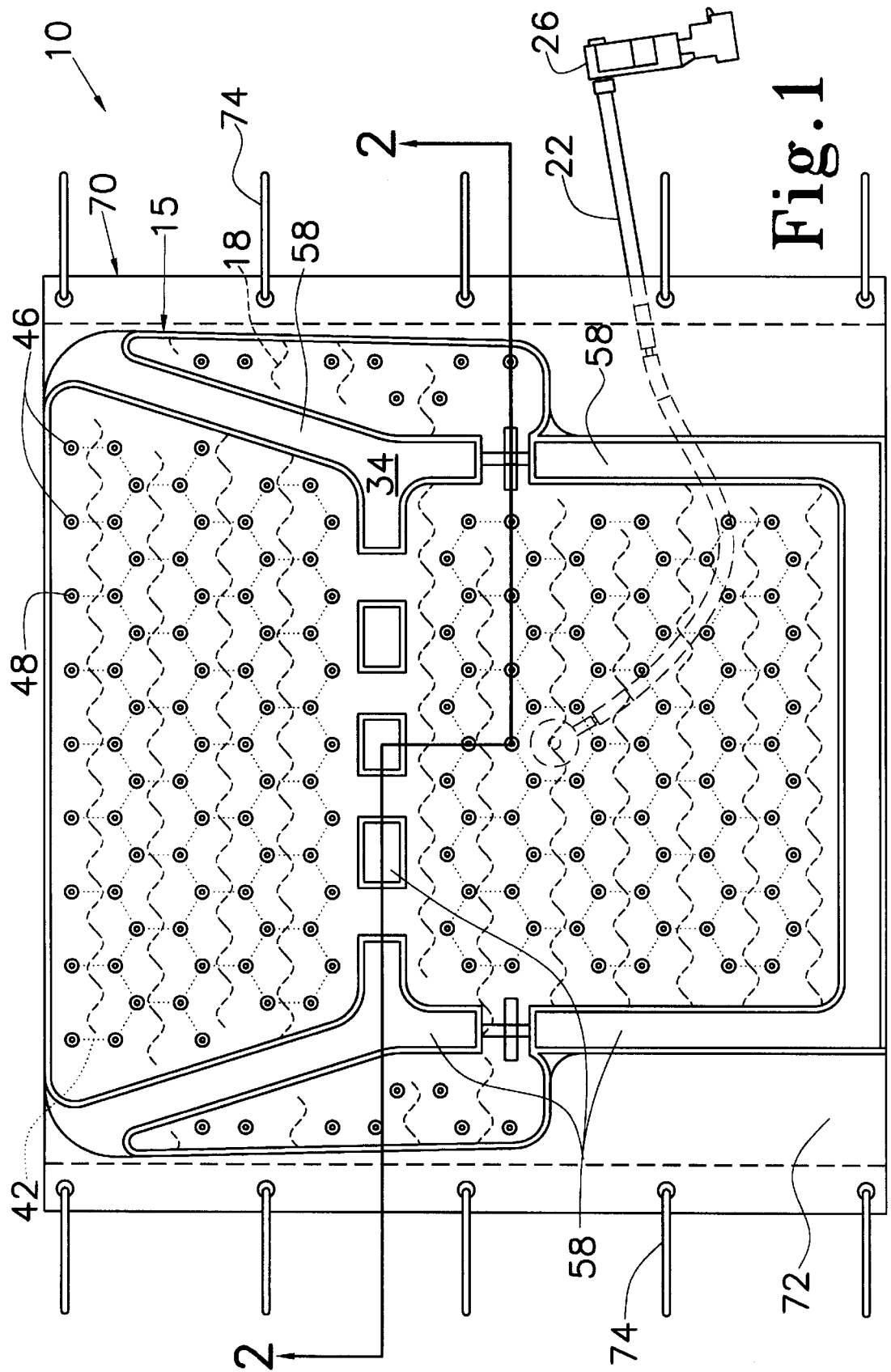

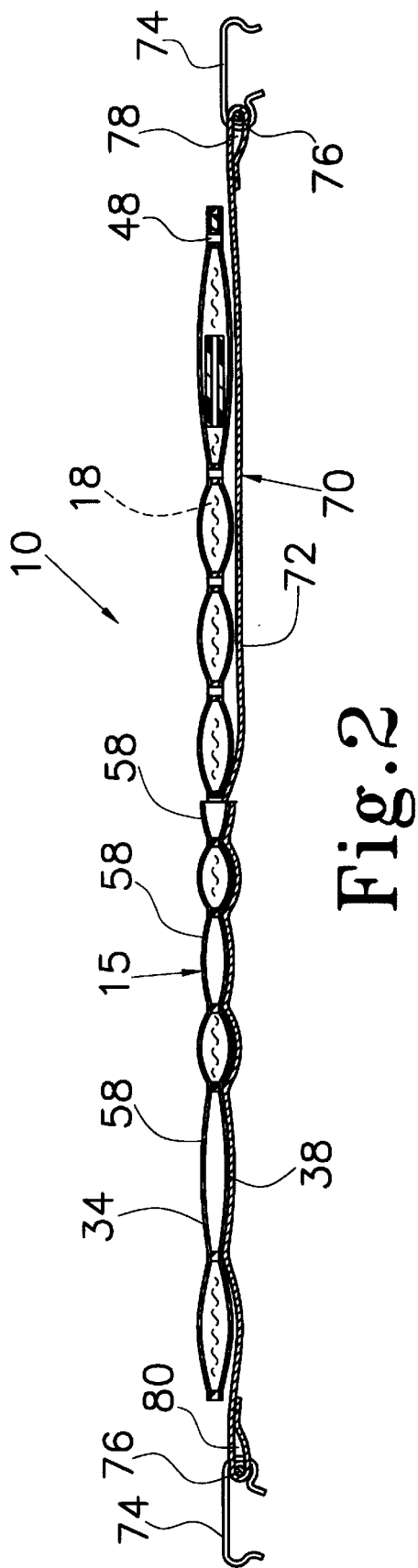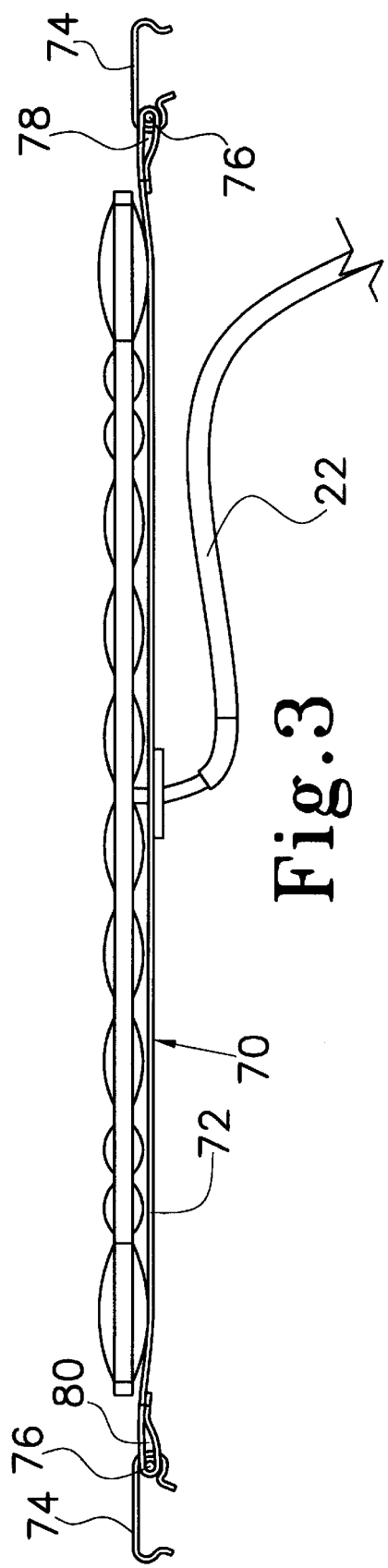

SENSOR PAD FOR CONTROLLING AIRBAG DEPLOYMENT AND ASSOCIATED SUPPORT

This application Ser. No. 09/146,677, a continuation in part discloses and claims subject matter disclosed in my earlier filed pending applications, Ser. No. 29/085,897, which was filed on Apr. 1, 1998; and Ser. No. 09/072,833, which was filed on May 5, 1998.

TECHNICAL FIELD

This invention relates to the field of weight sensing pads. More particularly, it relates to a sensor pad, and associated sensor pad support, for detecting both the presence and weight of a passenger for controlling deployment of an automobile airbag.

BACKGROUND ART

In recent years, airbags or self-inflating restraints, have proven to be effective in preventing injury resulting from head-on and near head-on collisions, when used correctly in conjunction with the shoulder-lap restraints. However, a small number of highly publicized incidents have highlighted a serious risk of potentially catastrophic injury to small adults, children or infants in rear-facing child-safety seats. While it is certainly advisable to place small children or infants in rear-facing child-safety seats in a rear seat, in certain types of vehicles, namely pick-up trucks, this is simply not an option. As a result, a demand has arisen for selective deployment of the automobile's self-inflating restraint. In response, certain automobile manufacturers now provide a key-switch to allow the owner/operator to choose whether or not the self-inflating restraint should be "armed" that is to say, whether the self-inflating restraint should be active and deployable in the event of a collision. However, these types of manual controls, or overrides, also carry an inherent risk. Namely the inadvertent failure to re-arm the restraint for an adult passenger, or the failure to deactivate the restraint in the event that the passenger seat is occupied by a child or safety seat. Further, the state of the art airbag deployment system does not detect whether the passenger seat is unoccupied and in the event of a collision fires the airbag, needlessly resulting in the unnecessary expense of replacing the dash and airbag mechanism.

What is missing in the art is a sensor pad that would detect the presence or absence of a person sitting in the seat and that could distinguish between an average size adult and a diminutive adult or child safety seat so as to control the deployment of an automobile self-inflating restraint, such as an airbag.

Accordingly, it is an object of the present invention to provide a sensor pad for controlling the deployment of a self-inflating restraint.

Another object of the present invention is to provide a sensor pad that is weight sensitive and that detects the presence of a person sitting in seat associated with the sensor pad and that upon detection of a person occupying the seat directs the airbag to deploy in the event of a collision.

Yet another object of the present invention is to provide a sensor pad for controlling the deployment of an automobile airbag without significantly increasing the vehicle weight or cost of manufacture.

Other objects and advantages over the prior art will become apparent to those skilled in the art upon reading the detailed description together with the drawings as described as follows.

DISCLOSURE OF THE INVENTION

In accordance with the various features of this invention, a sensor pad for controlling the deployment of an automobile airbag is provided. In the preferred embodiment, the weight sensing pad is used in the seat of an automobile to sense the detect the presence of the seat's occupant. The volumetric displacement of the fluid within the weight sensing pad produces a pressure change and is measured with an electronic pressure transducer and is used to determine if an airbag should be deployed upon impact in a collision. In this regard, the transducer is in electronic communication with the vehicle's airbag control module. The weight sensing pad is defined by a thin, fluid-filled bladder. The bladder is preferably constructed of two identical sheets of urethane. The urethane sheets are spot welded together at a plurality of points or areas in order to form cells, in a selected geometric configuration, in fluid communication with one another. The size, geometric configuration and cross-sectional area of the spots are selected so as to maximize performance while minimizing weight. In this regard, in order to minimize the weight of the bladder, internal volume must be small in relation to the external surface area of the weight sensing pad. The bladder in the preferred embodiment is filled with a non-compressible fluid having a very low freezing point, such that there are a minimum of air, or gas, pockets within the bladder. A silicone, such as silica gel, of medium viscosity is a suitable fluid.

Volumetric displacement, under pressure, of the fluid within the bladder is dependent on a number of factors such as bladder stiffness, i.e. the ability of the urethane material to resist stretching, the zero pressure volume of the bladder, the seated area of the passenger or child safety seat, and the weight of the seated passenger or car safety seat. Bladder stiffness can be measured in units of $lb/in^5$ and can be defined to be the slope of the curve of volume change vs. pressure increase. In other words bladder stiffness=pressure change/volume change=$lb/in^2/in^3$. Bladder stiffness is a function of the physical size and shape of the individual cells as well as the thickness of the bladder material. The preferred bladder will have a high bladder stiffness. The slope of the curve is not expected to be constant. As the bladder volume increases, the slope of the curve is expected to increase.

Zero pressure volume is defined as the volume of fluid that will first cause the pressure in the bladder to increase. In order to have minimum bladder weight, the zero pressure volume should be as small as possible. Thus, the preferred bladder has a relatively small zero pressure volume and a high degree of bladder stiffness. A bladder having a large number of relatively small internal cells in fluid communication with one another and a thin-wall bladder material meets these two criteria.

In one embodiment, the bladder is configured to be placed within the seat portion of a state of the art automobile seat. While, the bladder can be supported by a seat cushion, the bladder is preferably secured to a support member that is suspended on the seat frame. The bladder includes a pressure tube connected to a pressure activated electronic transducer that is in electronic communication with the air bag control module. As will be described in more detail below, the preferred transducer is digital and sends an arming signal to the airbag control module upon detection of a preselected pressure. The bladder further includes a plurality of securement regions for securing the bladder to the seat cushion or the support member. The bladder is formed by two urethane panels that are perimetrically sealed to each other. In the preferred embodiment, the two panels are additionally secured to one another by a plurality of relatively small, preferably circular spot welds configured to form hexagonal-like cells that are in fluid communication with each other. In an alternate embodiment, relatively large approximately octagonal spot welds are used to form small fluid cell areas, (about thirty-three percent cell area to about sixty-seven percent weld area), thus reducing the overall weight of the liquid in the bladder.

In use, an electronic transducer is selected to generate a signal upon detection of pressure resultant from the volumetric displacement of fluid inside the bladder expected from the average size adult of approximately one hundred pounds or heavier. In an alternate embodiment, an analog transducer could be utilized to generate a signal as a function of the passenger's weight. With this information the control module would fire the airbag in accordance with a preselected set of conditions. Further information regarding passenger weight could be used to determine the force at which a variable force airbag would deploy as airbag technology advances,

BRIEF DESCRIPTION OF THE DRAWINGS

FIG. 1 illustrates a plan view of the weight sensing pad and support member of the present invention.

FIG. 2 illustrates a cross sectional view of the weight sensing pad and support member of the present invention taken along line 2—2 in FIG. 1.

FIG. 3 illustrates and end view of the embodiment illustrated in FIG. 1.

BEST MODE FOR CARRYING OUT THE INVENTION

Figure 4:
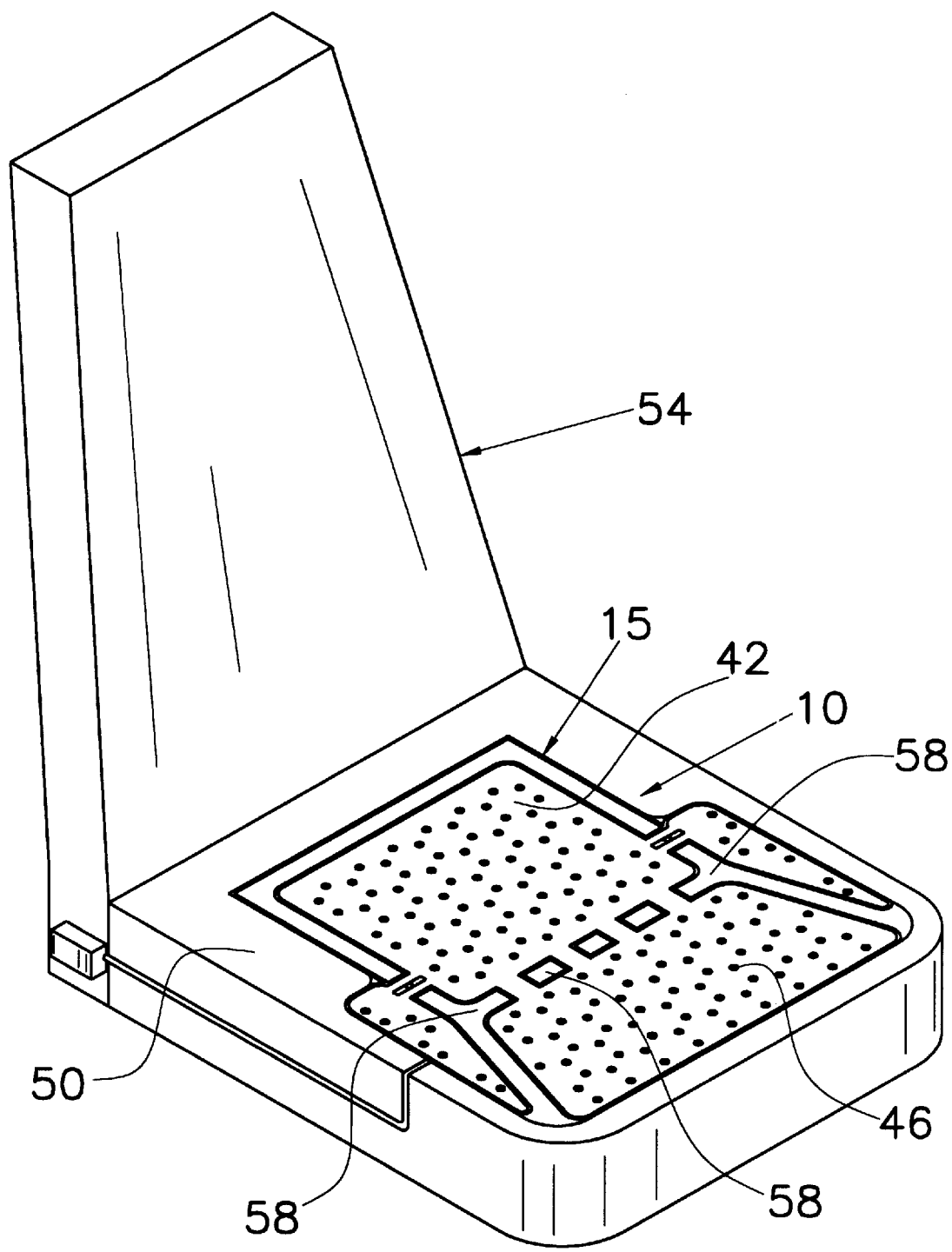
FIG. 4 illustrates a perspective view showing the weight sensing pad positioned above the cushioning in an exemplary automotive seat.
Figure 5:
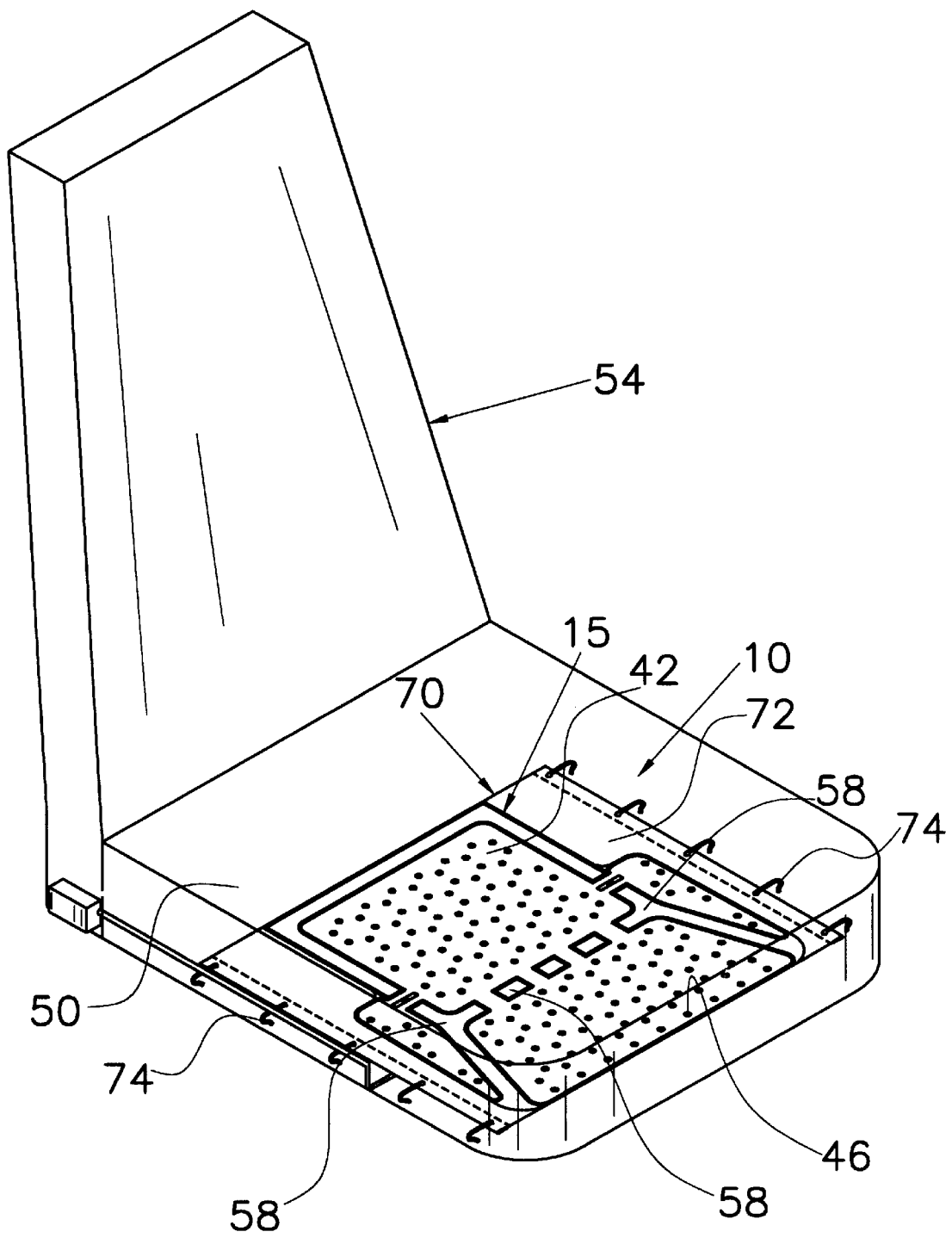
FIG. 5 illustrates a perspective view showing the weight sensing pad positioned below the cushioning in an exemplary automotive seat.
Figure 6:
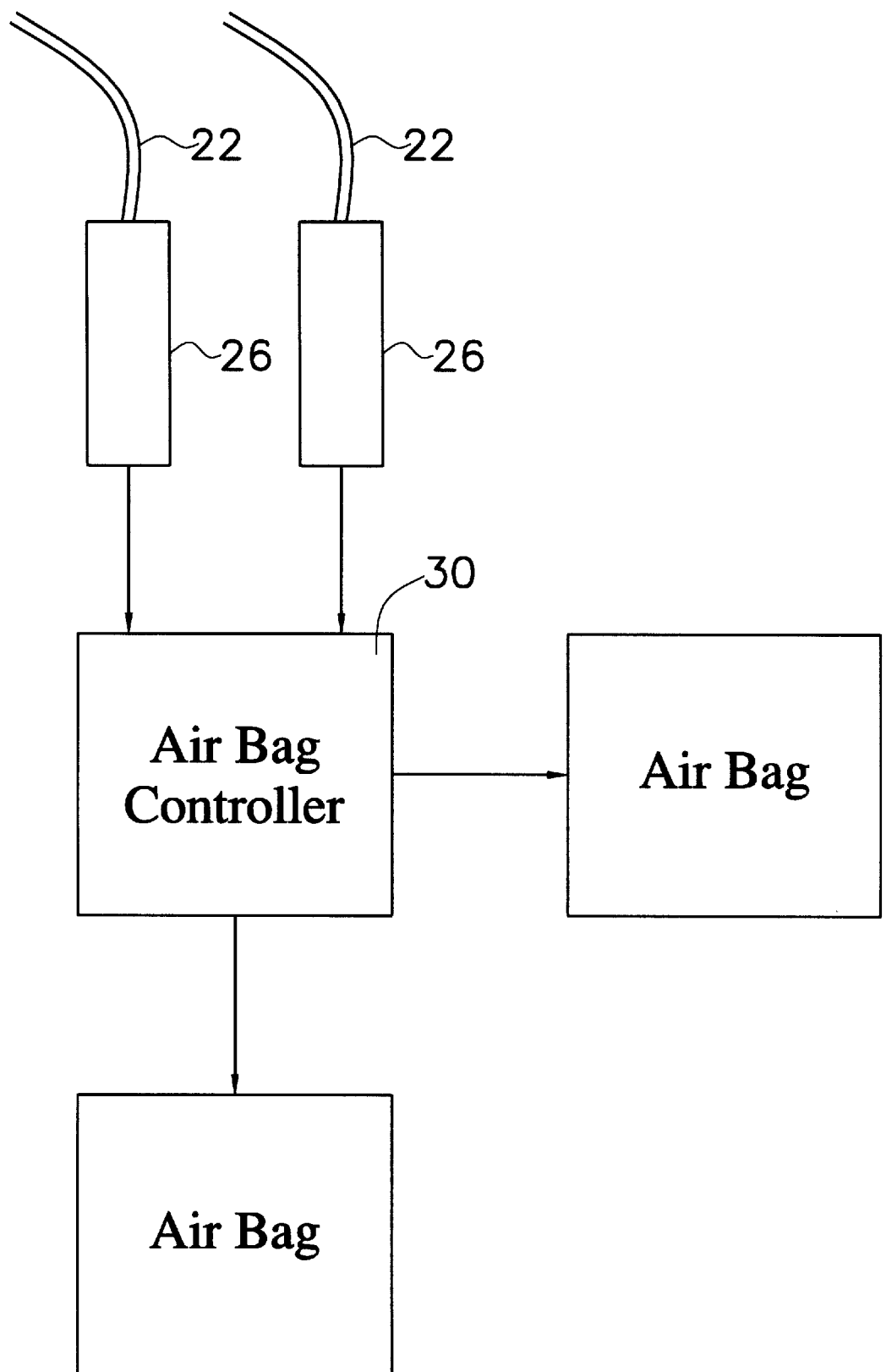
FIG. 6 illustrates a schematic view of the control of air bag deployment by the present weight sensing pad.

A sensor pad for controlling the deployment of an automobile airbag, constructed in accordance with the present invention, is illustrated generally as 10 in the figures. As seen in FIGS. 4 and 5, in the preferred embodiment, weight sensing pad 10 is used in the seat 54 of an automobile, (not illustrated), to detect the presence of an occupant on the seat. Weight sensing pad 10 is used in conjunction with the vehicle's airbag control module in order to allow deployment of the airbag, in the event of a collision, only if the seat is occupied by a person of above a preselected weight. Weight sensing pad 10 is defined by a bladder member 15 having an interior volume subdivided into a plurality of individual cells 42 in fluid communication with each other and that is filled with a non-compressible fluid 18, such as silicone or a silica gel of medium viscosity. In the preferred embodiment, fluid 18 should have a very low freezing point, preferably below the temperature of reasonably anticipated atmospheric conditions to which the typical automobile is exposed. A pressure tube 22 is in fluid communication with bladder 15 and is in further fluid communication with a pressure activated electronic transducer 26 which in turn is in electronic communication with the airbag controller 30. When a person sits upon a seat 54 in which a weight sensing pad 10 is mounted, there is a volumetric displacement of fluid 18 inside the bladder 15 causing the bladder 15 to change shape and consequently causes the pressure to increase which is measured by transducer 26. If there is a sufficient volumetric displacement of fluid to cause sufficient pressure change to activate transducer 26, transducer 26 sends a signal to air bag controller 30. In other words, if a passenger that weighs in excess of a preselected weight is seated on a seat 54 in which a weight sensing pad 10 is mounted, a sufficient volumetric displacement will occur to activate transducer 26.

In the preferred embodiment, bladder 15 is constructed of two preferably substantially identical sheets of urethane 34 and 38. Volumetric displacement, under pressure, of fluid 18 within bladder 15 is dependent on a number of factors such as bladder stiffness, i.e. the ability of the urethane material to resist stretching, the zero pressure volume of bladder 15, the seated area of the passenger and the weight of the seated passenger. Bladder stiffness can be measured in units of $lb/in^5$ and can be defined to be the slope of the curve of volume change vs. pressure increase. In other words, bladder stiffness=pressure change/volume change=$lb/in^2/in^3$. Bladder stiffness is a function of the physical size and shape of the individual cells 42 as well as the thickness of urethane sheets 34 and 38. In general, the bladder stiffness increases when the bladder pressure increases. The preferred bladder 15 will have a high bladder stiffness. The slope of the curve is not expected to be constant. As the bladder volume increases, the slope of the curve is expected to increase.

Zero pressure volume is defined as the volume of fluid 18 that will first cause the pressure in bladder 15 to increase. In order to have minimum bladder weight, the zero pressure volume should be as small as possible. Thus, the preferred bladder 15 has a relatively small zero pressure volume and a high degree of bladder stiffness. A bladder 15 having a large number of relatively small internal cells 42 in fluid communication with one another and a thin-wall urethane sheets 34 and 38 meets these two criteria. The urethane sheets 34 and 38 are spot welded together by a plurality of spot welds 46 in order to form cells 42, which are defined by the regions between spot welds 46, in a selected geometric configuration, in fluid communication with one another. In the preferred embodiment, a bore hole 48 is provided through each spot weld 46 in order to provide ventilation between the passenger and the seat. The size, geometric configuration and cross-sectional area of cells 42 are selected so as to maximize performance while minimizing weight. In this regard, in order to minimize the weight of the bladder 15, internal volume must be small in relation to the external surface area of the weight sensing pad 10.

The bladder further includes a plurality of securement regions 58 for securing bladder 15 in the seat area 50 either to the seat cushion directly or preferably to support member 70. In this regard, in the preferred embodiment, securement regions 58 are defined by fluid-void regions not in fluid communication with the fluid filled interior volume of bladder 15. Support member 70 is defined by a planar piece of fabric 72 and includes at least one hook member 74 which engages the seat frame (not shown). In this regard, in the preferred embodiment, at least one rigid rod member 76 is disposed in each of two loops 78 and 80 which are in spaced relation from each other. Hooks 74 are carried by rigid rod member 76. A seat cushion overlies sensor pad 10 and is also supported by support member 70.

Figure 7:
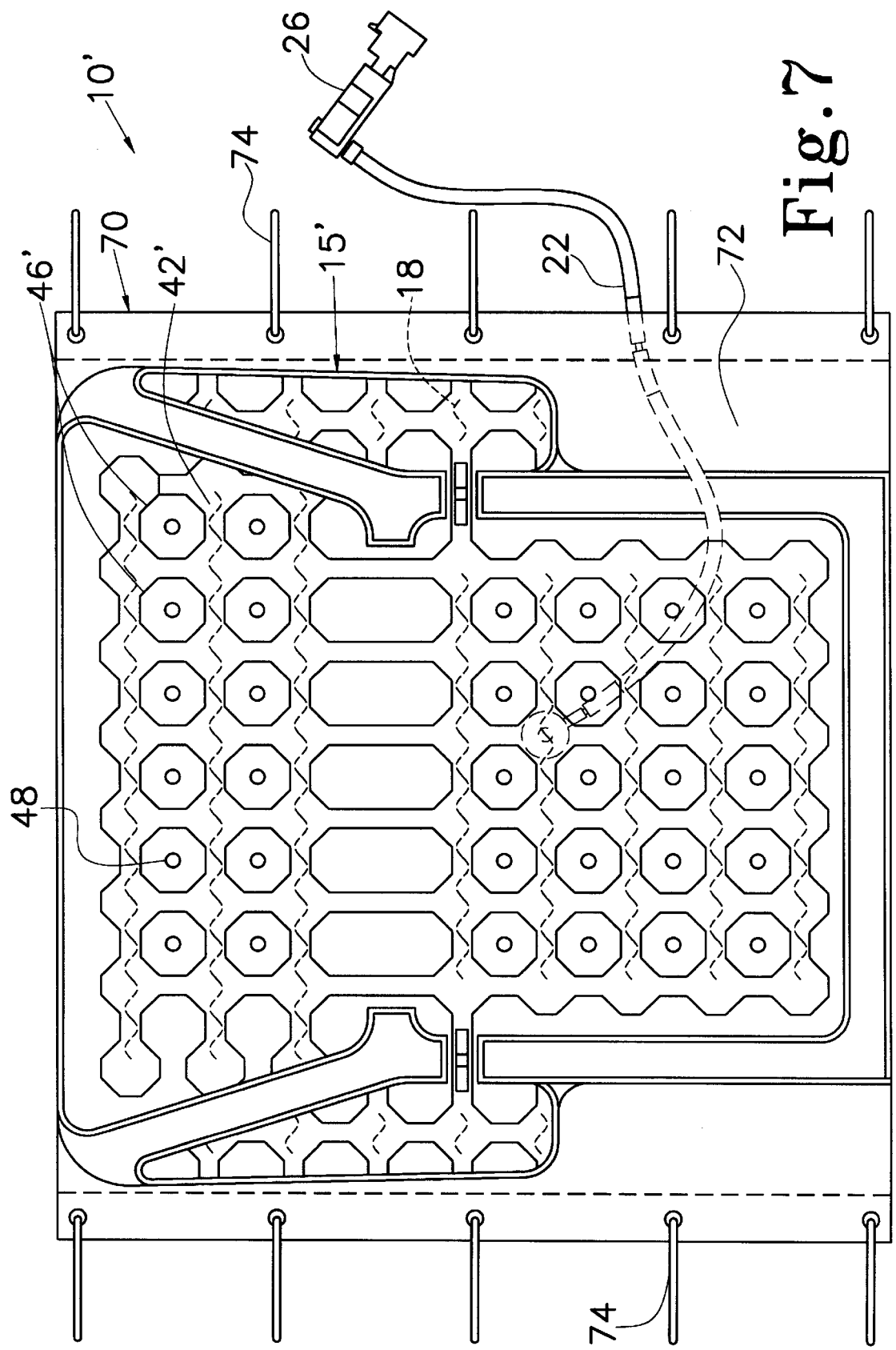
FIG. 7 illustrates an alternate embodiment weight sensing pad.

In the preferred embodiment, spot welds 46 are relatively small, circular and are selectively positioned so as to form substantially hexagonal cells 42 that are in fluid communication with each other. While hexagonal cells are preferred, other geometrically shaped cells could be utilized. In an alternate embodiment, illustrated in FIG. 7, relatively large octagonal spot welds 46' are used to form small fluid cell areas 42', (about thirty-three percent cell area to about sixty-seven percent weld area), thus reducing the overall weight of the bladder 15'. As above, a bore hole 48 is provided through each spot weld 46' in order to provide ventilation between the passenger and the seat.

In use, electronic transducer 26 is selected to generate a signal upon detection of pressure resultant from the volumetric displacement of fluid 18 from bladder 15 expected from the average size adult of approximately one hundred pounds or heavier. Thus, for a small adult or child less than one hundred pounds, or if a child seat is positioned on the seat, there will be insufficient volumetric displacement to cause a pressure change to activate transducer 26 and the airbag controller will not arm the airbag to deploy in the event of a collision. In an alternate embodiment, an analog transducer could be utilized to generate a signal proportional to the passenger's weight. With this information the control module would fire the airbag in accordance with a preselected set of conditions. Further information regarding passenger weight could be used to determine the force at which a variable force airbag would deploy as airbag technology advances.

From the foregoing description, it will be recognized by those skilled in the art that a weight sensing pad for controlling deployment of an automobile airbag offering advantages over the prior art has been provided. Specifically, the sensor pad for controlling the deployment of a self-inflating restraint provides a sensor pad that is weight sensitive and that detects the presence of a person of a selected weight sitting in seat associated with the sensor pad and that upon detection of a person of a selected weight occupying the seat directs the airbag to deploy in the event of a collision without significantly increasing the vehicle weight or cost of manufacture.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A weight sensing pad for an automobile seat, said weight sensing pad comprising:
   a bladder member having a compressible interior volume defined by first and second sheets perimetrically bonded together, wherein said bladder member is subdivided into a plurality of substantially hexagonally shaped cells by a plurality of small, substantially circular regions of bonding between said first and second sheets whereby said substantially hexagonally shaped cells are in fluid communication with each other; and
   a non-compressible fluid contained within said compressible interior volume of said bladder member.

2. The weight sensing pad of claim 1 wherein said regions of bonding are defined by spot welds.

3. The weight sensing pad of claim 1 wherein said fluid has a low freezing point.

4. The weight sensing pad of claim 1 wherein said fluid is silicon.

5. The weight sensing pad of claim 1 wherein said weight sensing pad further comprises a pressure activated electronic transducer in fluid communication with said bladder member and in electronic communication with an airbag control module, wherein said transducer is activated by a selected volumetric displacement of said fluid that provides a pressure change in said bladder member.

6. The weight sensing pad of claim 5 wherein said electronic transducer is a digital transducer.

7. The weight sensing pad of claim 1 wherein a bore is provided in substantially each of said plurality of small, substantially circular regions of bonding.

8. A weight sensing pad for controlling activation of an automobile airbag, said weight sensing pad comprising:
   a bladder member having an interior volume defined by first and second sheets perimetrically bonded together, wherein said bladder member is subdivided into a plurality of substantially hexagonally shaped cells in fluid communication with each other by a plurality of small, substantially circular regions of bonding between said first and second sheets;
   a fluid contained within said interior volume of said bladder member;
   a pressure activated electronic transducer in fluid communication with said bladder member and in electronic communication with an airbag control module, wherein said transducer is activated by a selected volumetric displacement of said fluid that provides a pressure change in said bladder member; and
   a pressure tube interconnected between and in fluid communication with said bladder member and said transducer.

9. The weight sensing pad of claim 8 wherein said fluid is non-compressible and has a low freezing point.

10. The weight sensing pad of claim 8 wherein said fluid is silicon.

11. The weight sensing pad of claim 8 wherein said weight sensing pad further comprises at least one securement region for facilitating securement of said weight sensing pad to an automobile seat.

12. The weight sensing pad of claim 8 wherein said weight sensing pad further comprises at least one support member for engaging a seat frame, said support member being defined by a planar support panel and having members for engaging a seat frame wherein said bladder member is secured to said support member.

13. The weight sensing pad of claim 8 wherein a bore is provided in substantially each of said plurality of small, substantially circular regions of bonding for providing ventilation through said weight sensing pad.

14. A weight sensing pad for controlling activation of an automobile airbag, said weight sensing pad comprising:
   a bladder member having an interior volume defined by first and second sheets perimetrically bonded together, wherein said bladder member is subdivided into a plurality of substantially hexagonally shaped cells in fluid communication with each other by a plurality of small, substantially circular regions of bonding between said first and second sheets, said bladder member including at least one securement region;
   at least one support member for engaging a seat frame, said support member being defined by a planar support panel secured to said at least one securement region and having members for engaging a seat frame wherein said bladder member is secured to said support member; and
   a fluid contained within said interior volume of said bladder member.

15. The weight sensing pad of claim 14 wherein said regions of bonding are defined by spot welds.

16. The weight sensing pad of claim 14 wherein said fluid is non-compressible and has a low freezing point.

17. The weight sensing pad of claim 14 wherein said fluid is silica gel.

18. The weight sensing pad of claim 1 wherein a bore is provided in substantially each of said plurality of small, substantially circular regions of bonding.

19. A weight sensing pad for an automobile seat, said weight sensing pad comprising:

- a bladder member having an interior volume defined by first and second sheets perimetrically bonded together, wherein said bladder member is subdivided into a plurality of substantially hexagonally shaped cells in fluid communication with each other by a plurality of small, substantially circular regions of bonding between said first and second sheets;
- a fluid contained within said interior volume of said bladder member; and
- at least one securement region for facilitating securement of said weight sensing pad to an automobile seat.

20. A weight sensing pad for an automobile seat, said weight sensing pad comprising:

- a bladder member having an interior volume defined by first and second sheets perimetrically bonded together, wherein said bladder member is subdivided into a plurality of substantially hexagonally shaped cells in fluid communication with each other by a plurality of small, substantially circular regions of bonding between said first and second sheets;
- a fluid contained within said interior volume of said bladder member; and
- at least one support member for engaging a seat frame, said support member being defined by a planar support panel and having members for engaging a seat frame wherein said bladder member is secured to said support member.

* * * * *